United States Patent [19] [11] 4,204,090
Heinzl [45] May 20, 1980

[54] PROCESS AND AN ARRANGEMENT FOR REDUCING THE REDUNDANCY OF BINARY CHARACTER SEQUENCES WHICH DESCRIBE CHARACTERS OR GRAPHIC PATTERNS

[75] Inventor: Joachim Heinzl, Munich, Fed. Rep. of Germany

[73] Assignee: Siemens Aktiengesellschaft, Berlin & Munich, Fed. Rep. of Germany

[21] Appl. No.: 942,916

[22] Filed: Sep. 18, 1978

[30] Foreign Application Priority Data

Oct. 27, 1977 [DE] Fed. Rep. of Germany ....... 2748289

[51] Int. Cl.$^2$ ..................... G11C 17/00; H04L 13/08; H04N 5/78
[52] U.S. Cl. .................................... 178/30; 178/23 R
[58] Field of Search ................ 178/17.5, 30, 79, 23 R; 358/263

[56] References Cited

U.S. PATENT DOCUMENTS 3,902,008  8/1975  Ogawa ................................. 358/263
4,107,457  8/1978  Hajduk ................................. 178/2 R

FOREIGN PATENT DOCUMENTS 2262461  9/1975  France .................................... 358/263

Primary Examiner—Thomas A. Robinson
Attorney, Agent, or Firm—Hill, Van Santen, Steadman, Chiara & Simpson

[57] ABSTRACT

In a system in which characters or graphic patterns are representd in punctiform fashion, the redundancy of binary character sequences which describe the characters or graphic patterns is reduced such that, within the binary character sequences, each binary character having a first binary value is assigned to a point which is to be represented and at least one interval corresponding to one element exist between two points represented by the same output component. Each element is split into a plurality of sub-elements and the binary character sequences which represent the characters or graphic patterns are split into sub-elements. Of the possible combinations ($2^n$) of a group (n) of binary characters of the binary character sequences, code words are assigned to those combinations in which the binary character having a predetermined binary value ("1") is followed by at least one number (k−1) of binary characters having another predetermined binary value ("0"), which number is dependent upon the number (k) of sub-elements within an element. The code words are transmitted and/or stored in place of the binary character sequences and in the representation of characters or graphic patterns code words are reassigned the original binary character sequences which are then fed to the output components. A scanning device is provided to scan a format which has a graphic pattern and emits binary character sequences to an encoder which assigns the code words to the binary character sequences and/or a memory is provided in which the code words of given characters or graphic patterns are stored and a decoder is provided which is supplied with the code words from the encoder or from the memory, the decoder operating to assign the binary character sequences to the code words and emit the latter to the output components.

9 Claims, 4 Drawing Figures

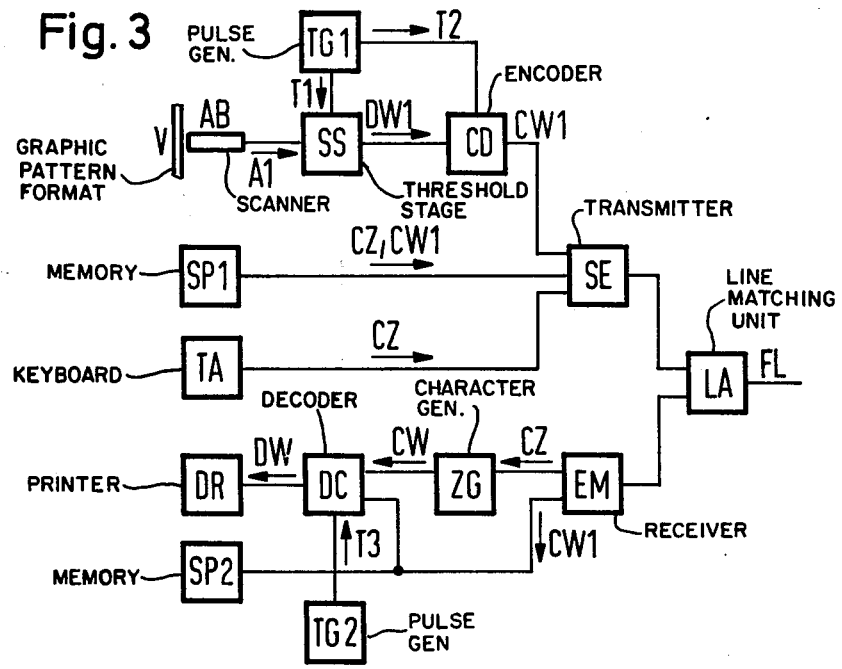
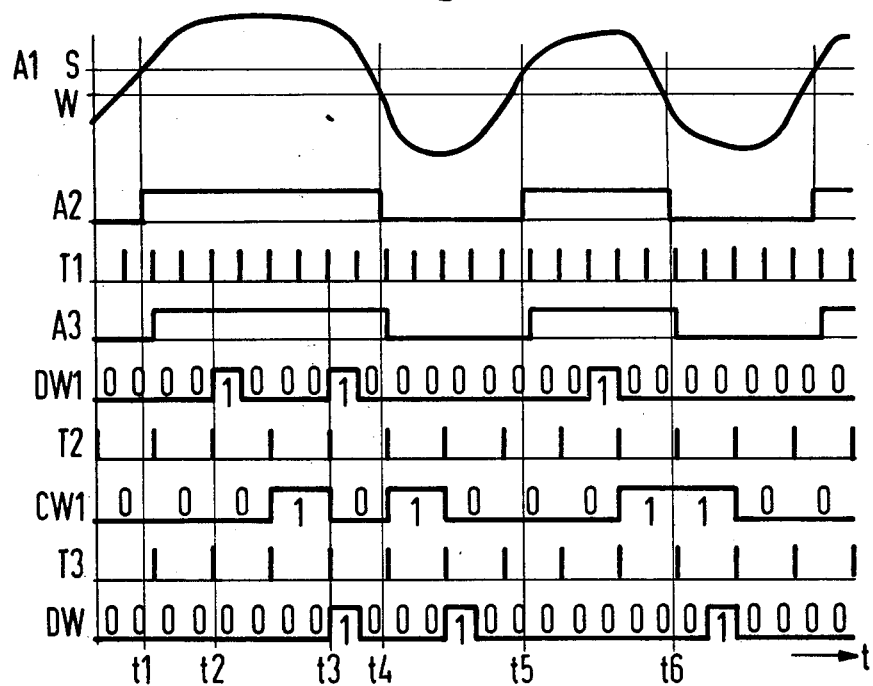

PROCESS AND AN ARRANGEMENT FOR REDUCING THE REDUNDANCY OF BINARY CHARACTER SEQUENCES WHICH DESCRIBE CHARACTERS OR GRAPHIC PATTERNS

BACKGROUND OF THE INVENTION

1. Field of the Invention

The present invention relates to a process and to apparatus for reducing the redundancy of binary character sequences which describe characters or graphic patterns, wherein the characters or graphic patterns are represented in punctiform fashion, and more particularly to techniques wherein, in the character sequences, each binary character having a first binary value is assigned to a point which is to be represented, at least one interval corresponding to one element is provided between two points represented by the same output component, each element is broken down into a plurality of sub-elements, and wherein the binary character sequences represent the characters or graphic patterns which have been broken down into the sub-elements.

2. Description of the Prior Art

In punctiform representation of alphanumeric characters and symbols by means of a mosaic printing head or on a screen of a data viewing device or television device, the charactes are represented by matrix points. The mosaic printing head comprises either a needle printing head having a plurality of printer needles driven by moving coils or an ink printing head having a plurality of nozzles controlled by piezoceramics. The number of printer needles or nozzles is equal to the number of rows in the matrix. In this case, the output component consists of a printer needle or nozzle known as a printing component. Following operation, the earliest time at which the printer needle or nozzle can be reactuated is that following an interval of time or space which is known as an element, in this case a printing element. If the mosaic printing head provided with the printing components is moved by one entire printing element between two actuations of printing components, the resolution of the represented characters is low.

A publication by B. Peukert and H. Senger: Schreibstation PT80, Siemens-Zeitschrift 51 (1977), Vol. 4, Pages 215–218 describes a printer terminal wherein the mosaic printing head is moved only by half a printing element between two actuations of the printing components in order to improve the resolution of the represented characters. Here, the number of printing components is not increased and the length of time between two actuations of the same printing component is not shortened. A further improvement in resolution is obtained by splitting a printing element into more than two sub-elements.

If each possible printing position within a character is assigned one binary character, with the normal coding providing an equal number of printing components, it is necessary to have a quantity of information which is proportional to the number of sub-elements per printing element and which must be stored in a character generator. Each printing component is assigned binary character sequences in the character generator and the number of binary characters in each character sequence is proportional to the number of sub-elements per printing element. When several sub-elements per printing element are used, it is consequently necessary to provide character generators having a large storage capacity.

Somewhat the same applies to the representation of characters or graphic patterns by means of a laser printer on a screen of a data viewing device or the representation of characters or graphic patterns in a television device.

SUMMARY OF THE INVENTION

The object of the present invention is to provide a process and an apparatus by way of which as high as possible a resolution of characters or graphic patterns to be represented is achieved by transmitting or storing the least possible information.

According to the present invention, the foregoing object is realized with techniques of the type generally described above in that from the possible combinations of a group of binary characters, within the character sequences, code words are assigned to those combinations in which a binary character having a first binary value is preceded and/or followed by at least one number of binary characters having the second binary value, which number is dependent upon the number of sub-elements in a printing element, that the code words are transmitted and/or stored in place of the binary character sequences, that when the characters or graphic patterns are represented the code words are again assigned the original binary character sequences, and that these binary character sequences are fed to the output components.

A process carried out in accordance with the present invention has the advantage that in the representation of characters or graphic patterns comprising a plurality of sub-elements, the items of information to be transmitted or stored do not increase in proportion to the number of sub-elements. For example, when characters or graphic patterns are represented in quarter elements, less information is required than in the case of known representation in half elements. A process carried out in accordance with the present invention is based on the fact that, in order not to increase the frequency of the output components, the only combinations of binary characters which are permitted in the character sequences are those in which at least $k-1$ binary characters having the binary value "0" must lie between two binary characters having the binary value "1", which represents a point, where k is the number of sub-elements within an element. This ensures that, following actuation, the earliest time at which each 1 output component can be reactuated is that following one entire element. In order to avoid redundancy, the selected combinations of binary characters are assigned to the code words which contain a smaller number of binary characters than the binary sequences.

If the characters or graphic patterns are represented in quarter elements, it is advantageous for, in each case, two binary characters of the binary character sequences to be assigned a binary character of the code words which indicates that a point is represented with one of the two quarter elements and for the following binary character the code words to indicate which of the two quarter elements with which the point is represented. This production of the code words is facilitated in that each binary character assigned to a point is followed by at least three binary characters which are not assigned to any point. If the characters or graphic patterns are represented in thirds of elements, it is advantageous, in each case, for three binary characters of the binary character sequences to be assigned two binary characters of the code words.

When the characters or graphic patterns are represented in half elements, a reduction in redundancy is achieved in that, in each case, four binary characters of the binary character sequences are assigned three binary characters of the code words.

In order to additionally employ the code words to represent control characters with which, for example, a transfer is made from the representation of characters to the representation of graphic patterns, it is advantageous for those code words which represent impermissible combinations of binary characters within the binary character sequences to be assigned control characters.

The process is used with particular advantage when the code words represent characters or graphic patterns which are stored in the memory and which are output following call-up by code characters.

If the process is employed in teleprinters or data printers or data viewing devices, it is advantageous for the code words to represent alphanumeric characters or symbols.

The process is used with advantage in facsimile transmission when the code words represent scanning signals which are produced in the scanning of a format provided with a graphic pattern.

An advantageous circuit arrangement for the execution of the process is characterized in that a scanning device is provided which scans a format which has a graphic pattern and emits data words to an encoder which assigns the code words to the binary character sequences and/or that a memory is provided in which the binary character sequences of given characters or graphic patterns are stored, and that a decoder is provided which is supplied with the code words from the coder or from the memory, and which assigns the binary character sequences to the code words and emits these to the output components.

BRIEF DESCRIPTION OF THE DRAWINGS

Other objects, features and advantages of the invention, its organization, construction and mode of operation will be best understood from the following detailed description, taken in conjunction with the accompanying drawings, on which:

FIG. 3 is a block diagram illustration of an arrangement for carrying out the process of the invention; and FIG. 4 is a timing diagram of signals at various points of the arrangement illustrated in FIG. 3.

DESCRIPTION OF THE PREFERRED EMBODIMENTS

Figures 1, 2:
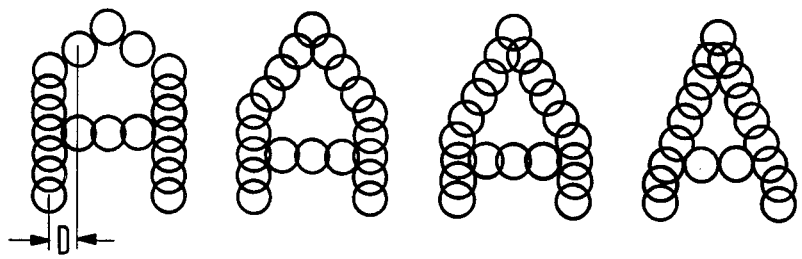
FIG. 1 is a diagrammatic illustration of the letter A in various sub-elements.
FIG. 2 illustrates the possible matrix points with a differing number of quarter elements and the associated binary character sequences and code words.

Referring to FIG. 1, and viewing from left to right, the letter A is illustrated as it can be represented by whole elements, half elements, thirds of elements, and quarters of elements by means of a mosaic printing head. The letter is represented in a pattern of matrix points, the number of rows in the matrix being determined by the number of output elements which are known as printing components, and the number of columns in the matrix being determined by the number of elements, known as printing elements, and the number of sub-elements within each printing element. The representation is, in each case, effected by nine printing components.

On the far left, the letter is represented by five whole elements and in the horizontal direction the points are spaced by an interval D which corresponds to one whole element. In order to be able to improve the resolution, on the one hand it will be possible to provide more than nine printing components and/or in order to achieve a finer grading along the row at the same printing speed, it would be possible to aim at a higher printing frequency of the printing components. However, both measures require a considerable extra expense in the matrix printing head.

If, on the other hand, the matrix printing head is moved, not in whole elements, but only in sub-elements, an improved resolution can be achieved at the same printing speed without increasing the number of printing frequency of the printing components. Therefore, in a known printer terminal, half elements are used so that the characters are represented in nine half elements. Thus, in the horizontal direction, almost twice as many pattern elements are provided as one printing component is required to print in order to produce a continuous line. However, following a printing command the same printing component cannot receive another printing command until following a minimum of two half elements. The letter A printed in half elements is the second from the left in FIG. 1.

A character can be better represented as more sub-elements are used. In FIG. 1, with a transition to more sub-elements, the bend in the oblique bar of the letter A constantly reduces as can be seen from the letters A represented in thirds of elements and quarters and elements in the right-hand half of FIG. 1. When quarter elements are used, as can be seen from the far right character in FIG. 1, the letter A can be represented in optimum fashion in accordance with the given point size. Similar results are obtained with respect to most other characters which contain rounded or slanting lines.

In the representation of a character, each printing component is supplied with a binary character sequence whose binary characters indicate whether the printing component to be actuated or not. For example, whenever the binary character assumes the binary value "1", a printing command is triggered and the printing component is actuated. When a character is represented to five whole elements, it is therefore necessary to supply each printing component with a character sequence comprising five binary characters. Accordingly, when a character is represented in nine half elements, each printing component would have to be supplied with a character sequence comprising nine binary characters and when representation is effected in 17 quarter elements, a character sequence comprising 17 binary characters would have to be supplied. As, however, each printing component can only be actuated after a minimum time corresponding to one whole printing element, many sequences of printing commands are impermissible. For example, when quarter elements are used, for three sub-elements preceding and following each printing command, the same printing command cannot be actuated by another printing command.

FIG. 2 illustrates the possible sequences of printing commands when graphic patterns are represented in quarter elements. The number n of the quarter elements is illustrated in the horizontal direction and the number of permissible sequences z of printing commands which can be supplied to the printing component is shown in the vertical direction. Each circle corresponds to a printing command or to a printing pulse which drives the printing component. Of all the possible combinations, the only ones which are permissible are those in which it is ensured that the printing commands occur with a minimum spacing of one whole printing element which corresponds to k=4 sub-elements.

With n=3 sub-elements, of the $2^3=8$ possible combinations of printing commands, only z=4 are permissible. Correspondingly, with n=6 sub-elements, of the $2^6=64$ possible combinations only z=10 are permissible, and with n=7 sub-elements of the $2^7=128$ possible combinations, only z=14 combinations are permissible. Therefore, the representation of these combinations by the character sequences requires considerably fewer binary characters. For example, with n=3 sub-elements, the z=4 permissible combinations can be represented by a code word CW consisting of two binary characters. Correspondingly, with n=6 sub-elements, the z=10 permissible combinations, and with n=7 elements, the z=14 permissible combinations can be represented by a code word CW comprising four binary characters. For example with n=7 sub-elements, the z=14 permissible combinations can be represented by the code words CW illustrated in FIG. 2, each comprising four binary characters.

In a character generator which stores the characters is therefore necessary to store the character sequences directly corresponding to the printing commands and the code words CW consisting of considerably fewer binary characters can, in fact, be stored. In the reproduction of the characters, the code words CW are fed to a decoder which regains the character sequences from the code words and supplies the character sequences to the printing elements. Correspondingly, when graphic patterns are transmitted by facsimile transmission the code words CW can be transmitted in place of the character sequences.

The following table illustrates the principal combinations z of printing commands in dependence upon the number n of sub-elements and in dependence upon the number k of the sub-elements which form one whole printing element. The table also illustrates the number B of binary characters which are necessary to encode the permissible combinations z.

The numerical values for z (n;k) can be determined in accordance with the following law of formation:

$z(n;k) = n + 1$ for $k > n$
$z(n;k) = Z(n - 1;k) + z(n - k;k)$ for $k < n$

| | K = 1 | | K = 2 | | k = 3 | | k = 4 | |
|---|---|---|---|---|---|---|---|---|
| n | z | B | z | B | z | B | z | B |
| 1 | 2 | 1 | 2 | 1 | 2 | 1 | 2 | 1 |
| 2 | 4 | 2 | 3 | 2 | 3 | 2 | 3 | 2 |
| 3 | 8 | 3 | 5 | 3 | 4 | 2 | 4 | 2 |
| 4 | 16 | 4 | 8 | 3 | 6 | 3 | 5 | 3 |
| 5 | 32 | 5 | 13 | 4 | 9 | 4 | 7 | 3 |
| 6 | 64 | 6 | 21 | 5 | 13 | 4 | 10 | 4 |
| 7 | 128 | 7 | 34 | 6 | 19 | 5 | 14 | 4 |
| 8 | 256 | 8 | 55 | 6 | 28 | 5 | 19 | 5 |
| 9 | 512 | 9 | 89 | 89 | 41 | 6 | 26 | 5 |
| 10 | 1024 | 10 | 144 | 8 | 60 | 6 | 36 | 6 |
| 11 | 2048 | 11 | 233 | 8 | 88 | 7 | 50 | 6 |
| 12 | 4096 | 12 | 377 | 9 | 129 | 8 | 69 | 7 |
| 13 | 8192 | 13 | 610 | 10 | 189 | 8 | 95 | 7 |

As can be seen from the table, when characters are represented in whole printing elements (k=1), the number z of the permissible combinations is equal to $2^n$ and the number B of the binary characters is equal to the number D of the printing components. When characters are represented in quarter elements (k=4), the number z of the permissible combinations is considerably smaller than $2^n$ and, for example, when characters are represented in n=13 sub-elements in place of the 8192 possible combinations only 95 combinations are permissible, which can be represented by seven binary characters of the code words CW. Also, when characters are represented in half elements or thirds of elements, only relatively few combinations are permissible which can be represented by code words CW with a small number of binary characters.

In comparison to a known printer terminal in which each half element is represented by one binary character, the process enables a reduction in binary characters to be stored or transmitted of above 50% so that quarter elements can be used in place of the half elements, while maintaining the same transmission speed or storage capacity. In accordance with a theoretical limit value, with representation in half elements, thirds of elements or quarter elements, 1.388, 1.654 and 1.860 binary characters, respectively, are required for each printer component for one entire printing element.

The arrangement illustrated in FIG. 3, represents a printer terminal by means of which recorded texts or other graphic patterns can be input, transmitted and represented. Characters are input by means of a keyboard TA which emits data words CZ assigned to the characters to a transmitter SE. The data words CZ correspond, for example, to the international standard CCITT Code No. 5. The data words CZ are transmitted via transmitter SE and via a line matching unit LA to a trunk line FL and/or to a receiver EM arranged in the printer terminal. If the characters are to be represented in a remote subscriber station containing a similar printer terminal, the data words are fed via the receiver EM contained therein to a character generator ZG in which the code words CW assigned to the characters are stored. The number of code words CW of a character is equal to the number of printer components DR with which the character is represented. The code words CW are fed to a decoder DC by which they are decoder and which produces binary character sequences DW which are fed to the printer components DR. In the character sequences DW, each binary character having a binary value "1" corresponds, for example, to one printing command. If the characters are to be stored, the data words CZ emitted from the receiver EM are fed to a memory SP1.

The data words CZ can also be input with the aid of a memory SP2 which is designed, for example, as a punched strip or magnetic tape memory.

The memory SP2 can also emit code words CW1 which describe graphic patterns, such as specific characters or pictorial representations. The code words CW1 are likewise transmitted by way of the transmitter SE and the line matching unit LA across the trunk line FL to a remote subscriber. By way of the receiver EM in the remote subscriber and in the transmitting terminal, the code words CW1 are directly fed, bypassing the character generator ZG, to the decoder DC by which they are decoded and which emits corresponding character sequences DW to the printing components DR. It is also possible to store the character sequences DW in the memory SP2, although for reasons of redundancy reduction it is favorable to store the code words CW1 therein and to transmit these to a remote subscriber or to the receiver EM of that particular terminal.

If the graphic patterns which are to be transmitted are in the form of a format V, for the purpose of facsimile transmission the graphic pattern is scanned with the aid of a scanner AB which emits scanner signals A1 to a threshold value stage SS. The threshold value stage SS produces light/dark signals and emits character sequences DW1 to an encoder CD. The encoder CD reduces the redundancy of the character sequences DW1 and emits code words CW1 by way of the transmitter SE and the line matching unit LA to the trunk line FL. In the remote subscriber station and/or in the originating printer terminal, the code words CW1 are fed to the receiver EM and the decoder DC to the printing components DR. If the scanner AB carries out a multi-track scanning, and for example the scanner AB contains as many scanning elements as the mosaic printing head contains printing components DR, the encoder CD contains a memory into which the data words DW1 assigned to the scanning elements are input in parallel. The encoder CD then consecutively emits code words CW1 assigned to the stored character sequences DW1 to the transmitter SE. Correspondingly, the decoder DC can contain a memory in which the code words CW are intermediately stored until all of the character sequences DW required for the actuation of the printing components DR are available.

In the timing diagram of FIG. 4, the time t is plotted in the direction of the abscissa and the instantaneous values of signals at various positions of the arrangement of FIG. 3 are illustrated in the ordinate direction.

At the time t1 the scanner signal A1 emitted from a scanning element in the scanning device AB exceeds an upper threshold value S which is assigned to a black level of the graphic pattern on the format V. A digitalization stage emits a digitalized scanner signal A2 which assumes the binary value "1" at the time t1. With the aid of the timing pulses T1 produced in a pulse generator TG1, the digitalized scanner signals A2 are brought into a pulse train pattern and scanner signals A3 are produced which change their binary values only at those times at which the timing pulses T1. The threshold value stage SS undertakes a selection of the scanner signals A3 in that the number of printing commands is established depending upon the number k of sub-elements within a whole printing element in order to reproduce a continuous black line. The representation has been based on the assumption that the scanner signal A1 is to be represented at the receiving end by quarter elements. The points produced for each printing component DR have a diameter which corresponds to approximately five period durations of the timing pulses T1. Therefore, it is sufficient to trigger a printing command at the time t2, i.e. following two period durations after the time t1. The next printing command cannot be triggered until the time t3, thus following four further period durations of the timing pulses T1. At the time t4, the scanner signal A1 undershoots the lower threshold value W which is assigned to a white level and the signal A2 assumes the binary value "0". Then, the scanner signal A3 assumes the binary value "0" and no further printing pulses are triggered. Between the times t5 and t6 a printing command is triggered similarly as between the times t1 and t4.

During a period duration of the timing pulses T1, each printing command is assigned a binary value "1" and if no printing command is to be triggered this is characterized by the binary value "0". The character sequences DW1 produced in this manner are fed to the encoder CD.

The encoder CD codes the character sequences DW1 and emits the code words CW1 at its output. Encoding is carried out similarly to a known process described in "The Bell System Technical Journal", October 1965, Pages 1572-1577. The encoder CD is supplied with the timing pulses T2 which have a period which is twice that of the timing pulses T1. During each period of the timing pulses T2 it is checked whether the character sequence DW1 contains the binary value "1". If the binary value "1" is included, during the next period duration the code word CW1 assumes the binary value "1". In order to now establish the position of the signal having the binary value "1" within the time pattern governed by the timing pulses T2, it is checked whether the binary value "1" occurs during the first or the second half of the period duration of the timing pulses T2. At the time t2 the binary value "1" occurs during the first half of the period duration of the timing pulses T2 and this is characterized in that the code word CW1 assumes the binary value "0" at the time t3 during the next period duration of the timing pulses T2. When the binary value "1" occurs during the second half of the period duration of the timing pulses T2, as is the case between the times t5 and t6, the code word CW1 retains its binary value "1" during the next period duration. If no binary character "1" occurs in the character sequences DW1 during a period duration of the timing pulses T2, during the next period duration of the time pulses T2 the code word CW1 has the binary value "0", provided it is not necessary to encode the position of a binary character "1" in the character sequences DW1 during this period duration. As the code words CW1 only change their binary values with the timing pulses T2, only half as many binary characters are required for transmission or storage as in the case of the character sequences DW1.

When the code words CW1 are received in the remote subscriber station, they are decoded in a known manner. The decoder DC is supplied with timing pulses T3 which are produced in the pulse generator TG2 and which are synchronous with the timing pulses T2. Whenever the code words CW1 assumes the binary value "1", during the following period duration of the timing pulses T3 a printing pulse is produced and a binary character within the character sequence DW assumes the binary value "1". When the following binary character in the code word CW1 has the binary value "0", the printing pulse is emitted directly at the beginning of the period duration of the timing pulses T3 and when it has the binary value "1" the printing pulse is not emitted until the second half of the period duration of the timing pulses T3. The printing pulses which represent the character sequence DW are fed to the printing components DR and black lines corresponding to the scanner signals A1 are reproduced.

Since, in accordance with theoretical considerations, in the case of representation by quarter elements, only 1.860 bits are required for one full element in respect of each printing component, and two bits are used in the coding illustrated in FIG. 4, 0.14 bits are still available with which it is possible, for example, to represent transfer characters enabling a differentiation between representation of transmission of alphanumeric characters by the data words CZ from the transmission of graphic patterns by code words CW1. In the case of the coding illustrated in FIG. 4, code words CW1 can be used, for example, as transfer characters in which three or a higher odd number of binary values "1" follow one another. Following decoding in the decoder DC this sequence is recognized as being impermissible since they are not sufficient sub-elements available between the printing commands.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A process for reducing the redundancy of binary character sequences which describe information including characters and graphic patterns represented in punctiform fashion, wherein within the binary character sequences each binary character having a first binary value is assigned to a point which is to be represented and at least one interval corresponding to one printing element is provided between two points represented by the same output component, wherein each element is divided into a plurality of sub-elements, and wherein the binary character sequences represent the information divided into sub-elements, the improvement therein comprising the steps of:
   generating and assigning code words such that of the possible combinations of a group of binary characters of the binary code sequences the code words are assigned to those combinations in which a binary character having a first binary value is followed by at least one predetermined number of binary characters having a second binary value, the predetermined number being dependent on the number of sub-elements within a printing element;
   transmitting the code words, in place of the binary character sequences, to a receiver;
   receiving the transmitted code words;
   reassigning the original binary character sequences to the received code words; and
   feeding the binary character sequences to operate output components.

2. The improved process of claim 1, wherein the information is represented in quarter elements, and the step of generating and assigning is further defined as:
   assigning two binary characters of a character sequence to a binary character of the code words indicating a point is represented at a quarter element; and
   assigning two binary characters of a character sequence to the following binary character of the code words indicating which of the two quarter elements at which the point is represented.

3. The improved process of claim 1, wherein the information is represented in thirds of elements, and the step of generating and assigning is further defined as:
   assigning three binary characters of the binary sequences to two binary characters of the code words.

4. The improved process of claim 1, wherein the information is represented in half elements, and the step of generating and assigning is further defined as:
   assigning four binary characters of the binary character sequences to three binary characters of the code words.

5. The improved process of claim 1, wherein the step of generating and assigning comprises the step of:
   forming certain code words and assigning the same to impermissible combinations of binary characters as control characters.

6. The improved process of claim 1, comprising the steps of:
   storing the received code words in a memory; and
   outputting the stored code words to the output components.

7. The improved process of claim 1, wherein the step of generating is further defined as:
   generating the information from alphanumeric characters and symbols.

8. The improved process of claim 1, wherein the step of generating and assigning is further defined as:
   scanning a format which contains a graphic pattern; and
   producing scanner signals corresponding to the scanned pattern.

9. In a system for reducing the redundancy of binary character sequences which describe information including characters and graphic patterns represented in punctiform fashion, in which, within binary character sequences, each binary character having a first binary value is assigned to a point which is to be represented and at least one interval corresponding to one printing element is provided between two points represented by the same output component, and in which each printing element is divided into a plurality of sub-elements and the binary character sequences represent the information divided into sub-elements, the improvement therein comprising:
   a scanning device operable to scan a format which bears a graphic pattern, and for producing binary character sequences as scanner signals representing the graphic pattern;
   an encoder connected to said scanning device for assigning code words to the scanner signals;
   transmission means connected to said encoder for transmitting said code words;
   receiver means for receiving said code words;
   decoder means connected to said receiver means for reassigning the original binary character sequences to said received code words; and
   output components connected to said decoder for reproducing the original scanned information.

* * * * *